United States Patent [19]

Claussen et al.

[11] Patent Number: 5,195,873
[45] Date of Patent: Mar. 23, 1993

[54] CHEMICAL TRANSFER SYSTEM

[75] Inventors: Steven W. Claussen, Clontarf Township, Swift County; Michael D. O'Dougherty, Maplewood, both of Minn.

[73] Assignee: C.A.P., Inc., Benson, Minn.

[21] Appl. No.: 852,375

[22] Filed: Mar. 13, 1992

[51] Int. Cl.⁵ .................................... F04B 49/02
[52] U.S. Cl. ........................... 417/18; 417/53; 417/63
[58] Field of Search ............ 417/18, 20, 44, 53, 417/63, 234; 418/171

[56] References Cited

U.S. PATENT DOCUMENTS

| | | | |
|---|---|---|---|
| 3,429,269 | 9/1969 | Walter | 418/171 |
| 4,467,657 | 8/1984 | Olsson | 417/63 |
| 4,906,165 | 3/1990 | Fox et al. | 417/12 |
| 4,925,371 | 5/1990 | Griesmar | 417/18 |

OTHER PUBLICATIONS

Product literture from Great Planes Industries concerning FM-300H Electronic Disc Meter and Model P-120H & P-200H Plastic Utility Pump, Jul. 1991.
Product literature from Aeroquip Corporation concerning "Drylock" (trademark) closed dispensing system, Bulletins DH20 & DH18, Mar. 1992.

Primary Examiner—Richard A. Bertsch
Assistant Examiner—David W. Scheuermann
Attorney, Agent, or Firm—William L. Huebsch

[57] ABSTRACT

A system adapted for use to transfer desired volumes of liquid chemicals from supplies of the liquid chemicals to a container. The system includes a reversible D.C. motor driven pump for moving liquid in either of two opposite directions, a counting system for counting part revolutions of the pump, and a calibrated chamber. The pump is operated for a predetermined number of part revolutions, the volume of liquid delivered by those part revolutions is determined using the calibrated chamber, and entered into a computer which then determines the amount of liquid delivered by each part revolution of the pump. In response to appropriate inputs, the computer then determines the number of pump part revolutions needed to deliver a needed amount of liquid to a container, and activates the pump for that number of part revolutions to deliver the needed amount of liquid to the container.

14 Claims, 3 Drawing Sheets

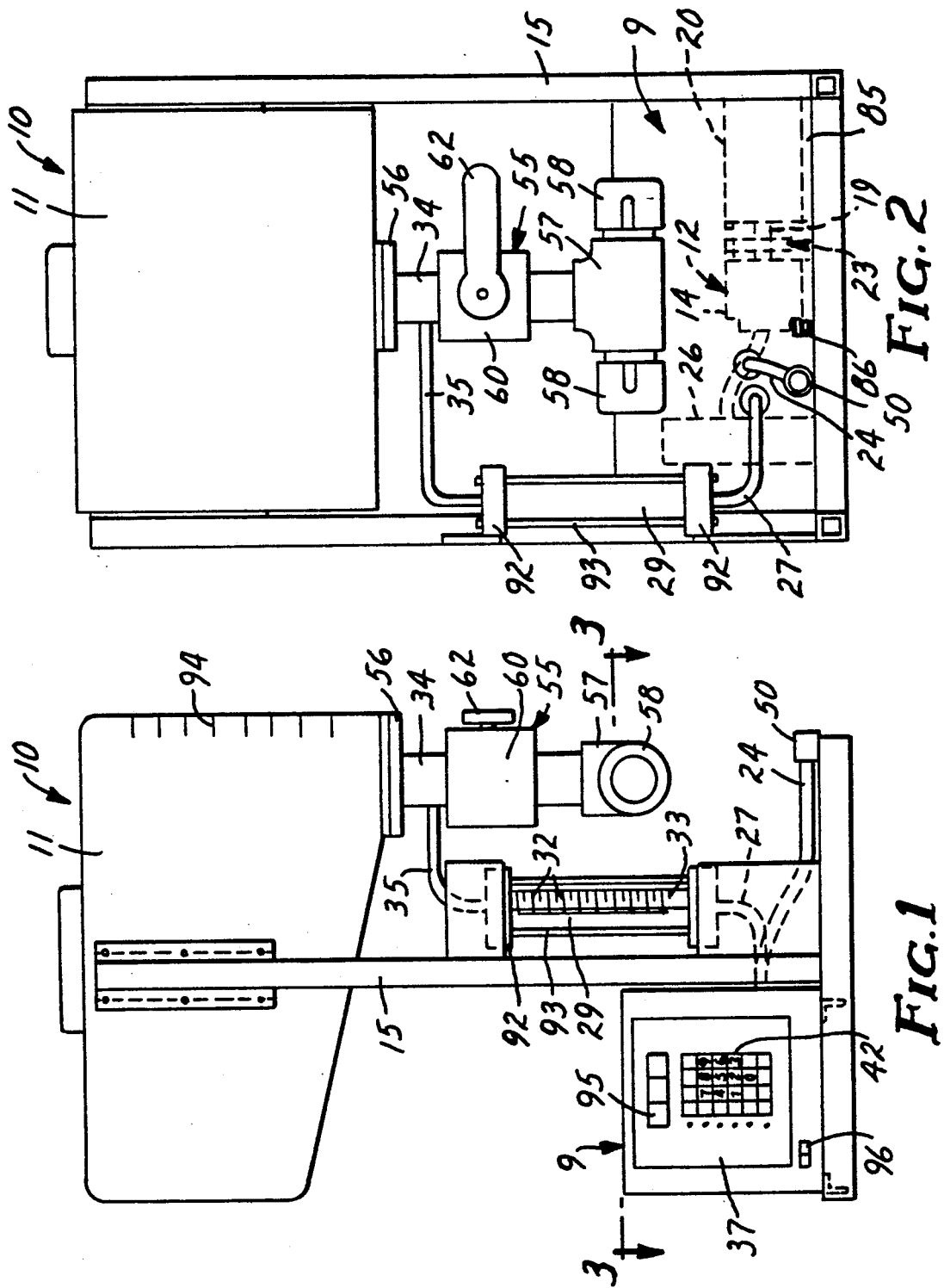

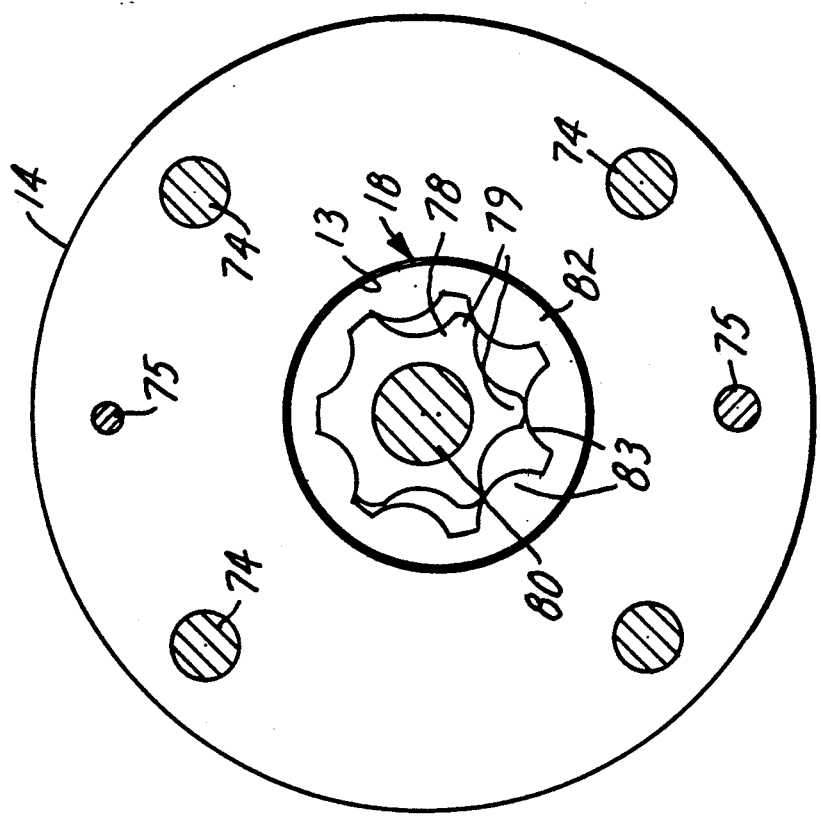

CHEMICAL TRANSFER SYSTEM

TECHNICAL FIELD

The present invention relates to systems adapted for use to transfer desired volumes of liquid chemicals from supplies of the liquid chemicals to containers, and particularly to such systems adapted to transfer desired volumes of liquid chemicals of the types applied to the earth or plants by those involved in agriculture, many of which liquid chemicals are dangerous to persons applying them.

BACKGROUND ART

Systems are known which are adapted for use to transfer desired volumes of liquid chemicals of the types applied to the earth or plants from supplies of the liquid chemicals to containers. Such systems may be as simple as a pail into which a predetermined volume of the liquid is poured and from which the liquid is poured into the container which may contain water which dilutes the chemical and which is applied with the liquid in a predetermined volume or amount per unit area onto the earth and/or plants. A more sophisticated system currently sold by Great Planes Industries, Incorporated, Wichita, Kans., includes a pump operable to transferring the liquid through a supply line from a supply of the liquid to a container, and an impeller in the transfer line that is operated by liquid flowing through the supply line and in turn operates a counter included in an electronic system associated with the impeller that counts the revolutions of the impeller. To operate the system, a user first transfers enough liquid by the pump and past the impeller to fill a container of a known volume (e.g., a 5 gallon pail), and then, using the electronic system, determines the volume of that liquid that passed the impeller during each rotation of the impeller and calibrates the electronic system so that each future revolution of the propeller that occurs in transferring a liquid will indicate that the same volume of liquid has passed the impeller. The calibrated system is then used to transfer a desired volume of the same liquid to a holding tank, the pumping system being manually stopped when the electronic system operated by the calibrated impeller indicates that the desired volume of liquid has been delivered. The delivered liquid is then typically mixed with other liquids (e.g., water), after which the mixture is sprayed onto a predetermined area or amount of earth and/or plants.

While either of these systems can be used successfully, both systems are easily misused so that the desired volume of liquid is not delivered, and both systems expose the user to the liquid more than is desired, particularly where the liquid is of the type that provides a high degree of danger to the user.

DISCLOSURE OF INVENTION

The present invention provides a system adapted for use to transfer a desired volume of liquid chemical from a supply of the liquid chemical to container which may be separate from or on equipment which dispenses or applies the chemicals, which system is particularly adapted to transfer desired volumes of liquid chemicals of the types applied to the earth or plants by those involved in agriculture, many of which liquid chemicals are dangerous to persons applying them. The system significantly restricts the exposure of persons using the system to the liquids being transferred compared to known prior art systems, while being easy to use, delivering accurate amounts of the liquid, and presenting less opportunities for operator misuse resulting in the delivery of the wrong volume of liquid than other known systems.

That system according to the present invention comprises a pump including pumping means mounted for rotation in two directions to move liquid in either of two opposite directions between inlet and outlet passageways in the pump, a motor adapted to rotate the pumping means in either direction, counting means for counting part revolutions of the pumping means, and means adapted for connecting the supply of the liquid to the inlet opening of the pump housing. The system also includes a wall defining a chamber, and liquid level indication means for providing an indication of the volume of liquid in the chamber (e.g., the wall having a plurality of calibration marks each indicating a different volume of liquid within the chamber when the upper surface of the liquid within the chamber is aligned with the mark) including initial level indicating means (e.g., a base calibration mark) indicating a predetermined small volume of liquid in the chamber compared to the total volume of the chamber and upper level indication means indicating a larger volume of liquid in the chamber than the initial level indicating means. Means are provided for conveying liquid expelled from an outlet opening of the pump housing to an inlet opening of the chamber, as are means adapted for conveying liquid expelled from an outlet opening of the chamber to the container. Pump calibrating means are provided which include control means for operating the motor to pump liquid into the chamber until the upper surface of the liquid within the chamber is aligned with the initial level indicating means (e.g., base mark on the wall); operating means for operating the pumping means for a predetermined or determinable number of part revolutions with the upper surface of the liquid within the chamber initially aligned with the initial level indicating means to pump a determinable or predetermined volume of the liquid into the chamber; and means including a programmed computer for receiving an indication of the determinable number of part revolutions from the counting means or of the determinable volume from the level indicating means and, based on that information, for setting in the computers memory the volume of the liquid pumped by each part revolution of the pumping means counted by the counting means. Means are also provided for receiving an indication of the desired volume of the liquid and for operating the pumping means only for a computer determined number of part revolutions to deliver the desired volume of liquid to the container.

In a presently preferred version of the system the liquid level indication means for providing an indication of the volume of liquid in the chamber consists of the wall having a plurality of calibration marks with individual identifying indicia each indicating a different volume of liquid within the chamber when the upper surface of the liquid within the chamber is aligned with the mark, the control means comprises manually operable means by which the operator can operate the pump as needed in both directions to pump liquid into the chamber until the upper surface of the liquid within the chamber is aligned with the base mark on the wall, the operating means is manually actuated, and when actuated, operates the pumping means for a predetermined number of part revolutions, the volume of liquid pumped into the chamber by the predetermined number of part revolutions of the pumping means is determined by visually aligning the liquid level in the chamber with one of the calibration marks, and the programmed computer is adapted to receive a manually generated input indicating that liquid level in the chamber.

Preferably, The means in the system including the programmed computer for receiving an indication of the desired volume of the liquid and for operating the pumping means for an amount of part revolutions determined by the computer for delivering the desired volume of liquid to the container is adapted to either receive that indication of the desired volume directly, or to receive an input representing an amount or volume for a designated area (e.g., typically in the range of 6 to 32 ounces per acre) and a separate input representing a number of said designated areas over which the liquid is to be spread (e.g., 20 acres).

Thus, to operate the presently preferred version of the system, the operator connects a supply of the liquid to the inlet opening of the pump housing; manually operates the motor and thereby the pumping means forward (and, if necessary, backward) for the time needed to provide a liquid level in the chamber at the base mark in the wall; manually actuates the operating means which operates the pumping means for a predetermined number of part revolutions with the liquid level in the chamber initially at the base mark in the wall to pump an unknown volume of liquid into the chamber; determines the volume of liquid pumped into the chamber by visually determining the indicia at the mark aligned with the upper surface of the liquid within the chamber; manually enters the indicia indicating of the volume of liquid pumped into the chamber into a computer programmed for receiving that indicia and, based on receipt of that indicia, for setting in the computers memory the volume of the liquid pumped by each part revolution of the pumping means counted by the counting means (i.e., which setting is in part accomplished by comparing the volume of the liquid pumped into the chamber by operation of the pumping means for the predetermined number of part revolutions with the predetermined volume of a standard liquid that would be pumped by that predetermined number of part revolutions, and changing that predetermined number of part revolutions either by adding to it or subtracting from it so that the new predetermined number will pump the standard volume of the new liquid), and manually enters the indication of the desired volume of the liquid to be supplied to the container into the computer and actuates the computer to operate the pumping means only for an amount of part revolutions determined by the computer to deliver the desired volume of liquid to the container, which desired volume can be entered directly, or by entering an input representing an amount or volume desired for a designated area (e.g., 6 to 32 ounces per acre) and entering a separate input representing a number of said designated areas over which the liquid is to be spread (e.g., 20 acres).

Alternatively, the liquid level indication means for providing an indication of the volume of liquid in the chamber can consist of the wall having a plurality of or two calibration marks (a base mark and an upper mark), each mark indicating a different predetermined volume of liquid within the chamber when the upper surface of the liquid within the chamber is aligned with the mark, the control means can include means by which the operator can operate the pump as needed in both directions to pump liquid into the chamber until the upper surface of the liquid within the chamber is aligned with the base mark on the wall, the operating means can include means by which the operator can then operate the pump as needed in both directions to further pump liquid into the chamber until the upper surface of the liquid within the chamber is aligned with the upper mark on the wall, the number of part revolutions of the pumping means to pump the predetermined volume of liquid could be determined by the counting means and the computer could have an input receiving an indication of the number of part revolutions counted by the counting means.

Thus, to operate that alternate version of the system, the operator would connect a supply of the liquid to the inlet opening of the pump housing; manually operate the motor and thereby the pumping means forward (and, if necessary, backward) for the time needed to provide a liquid level in the chamber at the base mark in the wall; manually operate the motor and thereby the pumping means forward (and, if necessary, backward) for the time needed to provide a liquid level in the chamber at the upper mark in the wall; and manually enter the indication of the desired volume of the liquid to be supplied to the container into the computer and actuate the computer to operate the pumping means for an amount of part revolutions determined by the computer to deliver the desired volume of liquid to the container, which desired volume could be entered in either of the manners described above. This method is not preferred because the operator may run the pump at different rates of speed to pump liquid to the upper mark, and such different rates of speed may cause slight variations in the a volume of liquid pumped per part revolution that can effect the accuracy of the system.

It is also contemplated that the liquid level indication means for providing an indication of the volume of liquid in the chamber, rather than being the wall having a plurality of calibration marks, could be provided by electronic liquid level sensing means of known types that provide signals to the computer to both indicate the predetermined small volume of liquid in the chamber, and to either indicate to the computer the amount of the determinable volume of the liquid that was pumped into the chamber by operation of the pumping means for a predetermined number of part revolutions, or indicate to the computer when the predetermined amount of liquid has been pumped into the chamber, thereby eliminating the need for the operator to visually align the liquid level with calibration marks on the wall. Operation of such a system would only require the operator to connect a supply of the liquid to the inlet opening of the pump housing, start the system, and manually enter the indication of the desired volume of the liquid to be supplied to the container into the computer and actuate the computer to operate the pumping means for an amount of part revolutions determined by the computer to deliver the desired volume of liquid to the container, which desired volume could be entered in either of the manners described above.

BRIEF DESCRIPTION OF DRAWING

The present invention will be further described with reference to the accompanying drawing wherein like reference numerals refer to like parts in the several views, and wherein:

FIG. 1 is a vertical front view of a system according to the present invention that is adapted for use to transfer a desired volume of liquid chemical to a container from a supply of the liquid chemical;

FIG. 2 is a vertical side view of the system of FIG. 1;

FIG. 5 is an enlarged sectional view taken approximately along line 5—5 of FIG. 3; and FIG. 6 is an enlarged front view a control panel from the system of FIG. 1.

DETAILED DESCRIPTION

Figure 4:
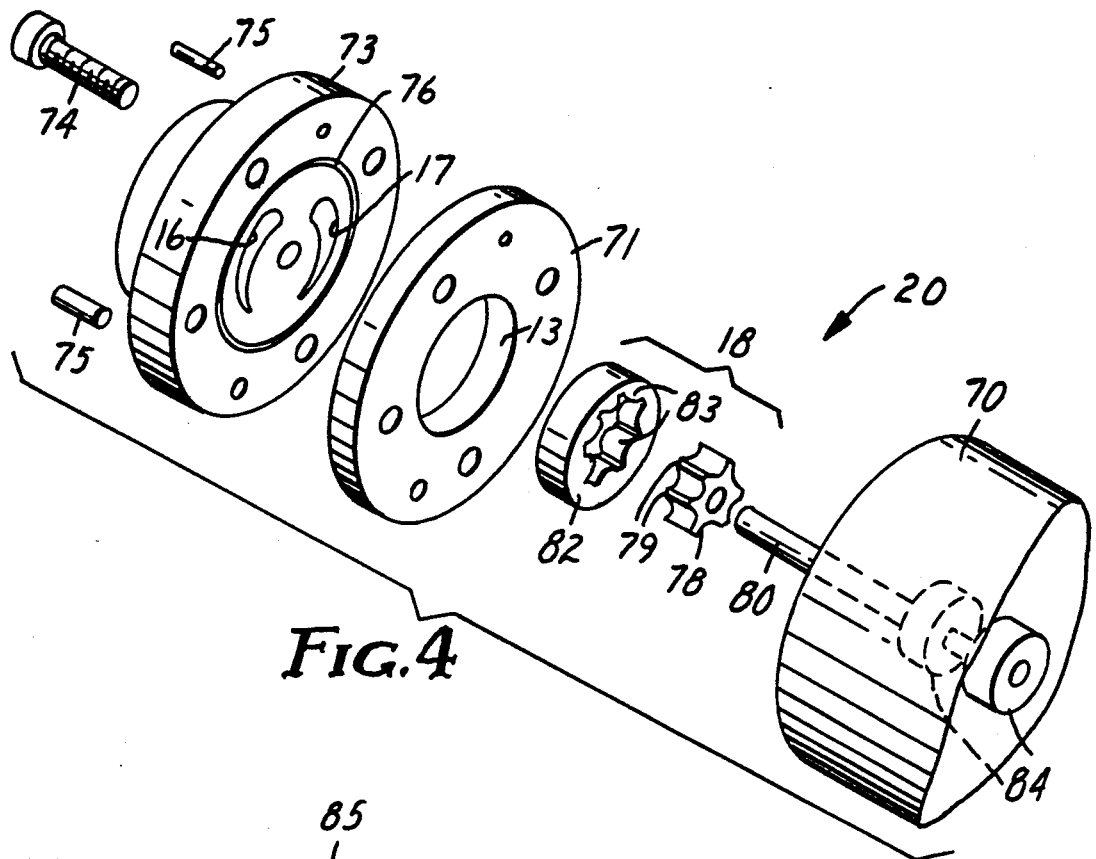
FIG. 4 is an enlarged exploded view of a pump illustrated in FIGS. 2 and 3.

Referring now to the drawing, there is shown a system 10 according to the present invention that is adapted for use to transfer a desired volume of liquid chemical to a container 11 from a supply of the liquid chemical which may be contained in a pail or drum (not shown).

Figure 3:
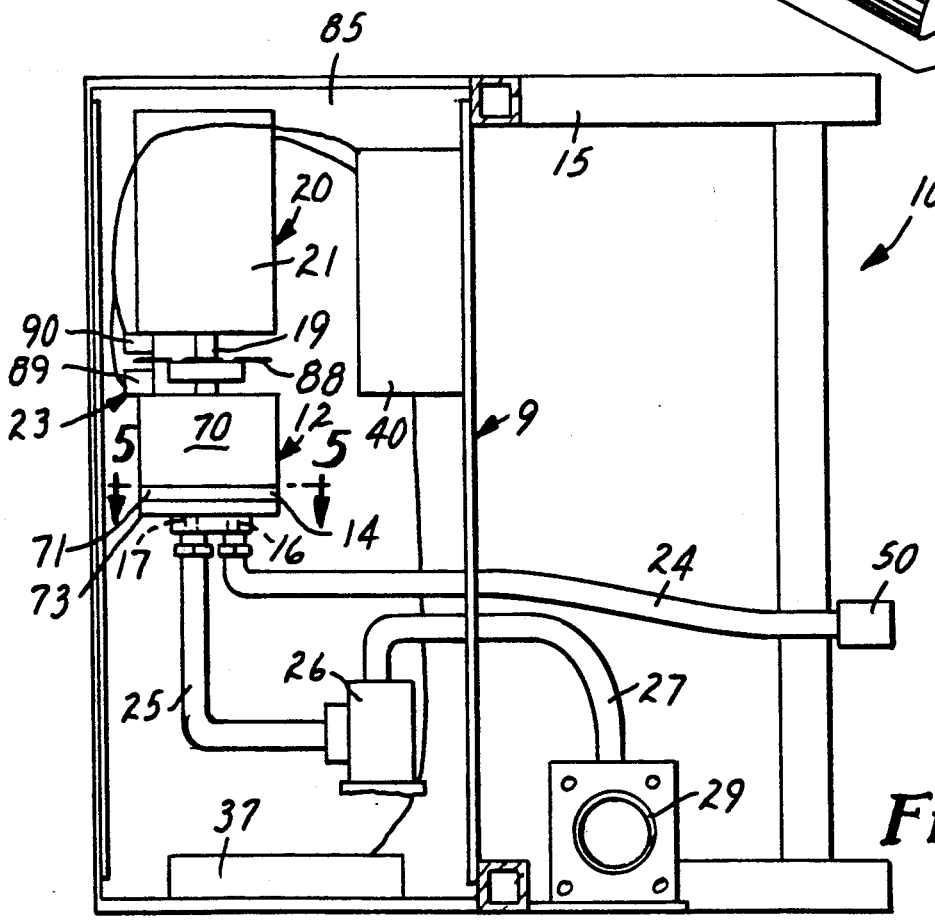
FIG. 3 is an enlarged sectional view taken approximately along line 3—3 of FIG. 1.

Generally the system 10 includes a pump 12 (FIGS. 3 and 4) comprising a pump housing 14 mounted in a portable electronic/pumping assembly 9 removably supported on a frame 15 of welded tubular members. The pump housing 14 has an internal cylindrical cavity 13 (FIGS. 4 and 5) and inlet and outlet passageways 16 and 17 communicating with the cavity 13, and rotatable pumping means 18 (later to be explained) within the cavity 13 coupled to a rotor portion 19 of a reversible motor 20. The the motor 20 may be selectively activated so that the rotor portion 19 rotates in either direction relative to a housing 21 for the motor 20 to thereby pump or move liquid in either of two opposite directions between the inlet and outlet passageways 16 and 17. Counting means 23 (later to be explained) are provided for counting part revolutions of the pumping means 18. Also provided are means in the form of an inlet tube or hose 24 for connecting the supply of the liquid to the inlet passageway 16 of the pump housing 14; and a first outlet tube or hose 25, an electrical solenoid operated normally off valve assembly 26, and a second outlet tube or hose 27 that together provide means for connecting the outlet passageway 17 of the pump housing 14 to the inlet opening of an elongate vertically disposed tubular wall 29 at a lower end of the wall 29. The wall 29, which is mounted on the frame 15, defines a chamber having an outlet opening at an upper end of the wall 29 opposite its inlet opening, and has a plurality of calibration marks or vertically spaced horizontal lines with a different identifying indicia or number 32 beside each mark (FIG. 1) providing liquid level indicating for indicating a different volume of liquid within the chamber when the upper surface of the liquid within the chamber is aligned with the mark. The calibration marks include a base mark 33 indicating a small volume of liquid in the chamber compared to the total volume of the chamber. Means in the form of a translucent tube 35 are provided for conveying liquid expelled from the outlet opening of the calibrated chamber wall 29 to a pipe 34 coupled by a flange 56 to the outlet opening of the container 11, which container 11 is also mounted on the frame 15.

The system 10 also comprises calibrating means adapted for interaction with an operator of the system including (1) control means including means manually actuatable by pressing either a "PURGE FWD" switch 36 (see FIG. 6) on a control panel 37 for the system 10 that, only so long as the switch 36 is pressed to hold it on, actuates the motor 20 in a forward direction to pump liquid from the inlet passageway 16 to the outlet passageway 17, or a "PURGE REV" switch 38 on the control panel 37 that, only so long as the switch 37 is pressed to hold it on, activates the motor 20 in a reverse direction to pump liquid from the outlet passageway 17 to the inlet passageway 16; the switches 36 and 38 being manually actuated as needed by the operator to pump liquid from the supply of liquid into the chamber in the calibrated chamber wall 29 until the operator visually aligns the upper surface of the liquid within the chamber with the base mark 33 in the calibrated chamber wall 29 (such activation primarily requiring use of the switch 36 to cause the pumping means 18 to pump the liquid from the supply of liquid into the calibrated chamber wall 29, and, in the event more liquid than is needed is pumped into the calibrated chamber wall 29 so that the liquid level in the chamber is above the base mark 33, also potentially requiring activation of the switch 38 by the operator to cause the liquid to be pumped from the calibrated chamber wall 29 back toward the supply); (2) operating means activated by the operator pressing and releasing a "CAL" switch 39 on the control panel 37 for operating the motor 20 at an essentially constant rotational speed to cause a predetermined number of part revolutions of the pumping means 18 to pump an unknown volume of the liquid into the chamber in the calibrated chamber wall 29 (the volume being unknown because of differences in pumping characteristics between different chemicals that may be pumped due to their viscosities, temperatures, or other characteristics), which switch 39 is intended to be operated with the upper surface of the liquid within the chamber initially aligned with the base mark 33 in the calibrated chamber wall 29 so that, after the switch 39 is activated to operate the pumping means 18, the unknown volume is determinable by the operator reading the indicia 32 by the calibration mark on the calibrated chamber wall 29 that is aligned with the upper surface of that unknown volume in the chamber; and (3) means included in a programmed microprocessor or computer 40 activated by use of an "ENTER" switch 41 after the operator has entered the indication of that unknown volume read from the calibrated chamber wall 29 by the use of a numeric key pad 42 for setting in the memory of the computer 40 the volume of the liquid pumped by each part revolution of the pumping means 18 counted by the counting means 23; and (4) means in the computer 40 for receiving an indication of the volume of the liquid desired in the container 11 through the operators use of the numeric key pad 42 and for then actuating the motor 20 to operate the pumping means 18 for a number of part revolutions determined by the computer 40 to deliver the desired volume of liquid to the container 11. The operator can provide the indication of the volume of the liquid desired in the container 11 in two ways, either (1) directly through the use of the numeric key pad 42 and a "TOTAL OUNCE" switch 44, or (2) by providing two separate inputs to the computer 40, including an input representing a number of the designated areas (e.g., 30 acres) to which the liquid is to be applied entered through the use of the numeric key pad 42 and an "ACRES" switch 45, and an input representing a volume of liquid for a designated area (e.g., 10 ounces per acre) entered through the use of the numeric key pad 42 and an "OZ/ACRE" switch 46.

Use of the system 10 by an operator comprises the steps of providing a supply of the liquid at the inlet passageway 16 of the pump housing 14, which may be done by connecting the end of a hose from a container of the liquid (not shown) to a coupling 50 that is at the end of the hose 24 attached to the inlet passageway 16 to the pump 12; operating the motor 20 and thereby the pump 12 by manual manipulation of the "PURGE FWD" and "PURGE REV" switches 36 and 38 as needed to provide a liquid level visually aligned at the base mark 33 in the calibrated chamber wall 29; operating the pump 12 for a predetermined number of part revolutions of the pumping means 18 with the liquid level initially positioned at the base mark 33 in the calibrated chamber wall 29 by pressing the "CAL" switch 39 to pump an unknown volume of liquid into the chamber in the calibrated chamber wall 29; determining the indication of the volume of liquid pumped into the calibrated chamber wall 29 by visually aligning the upper surface of the liquid within the chamber with one of the marks on the wall 29 and reading the indicia 32 at that mark; entering the indicia 32 indicating the volume of liquid pumped into the calibrated chamber wall 29 into the computer 40 through use of the numeric key pad 42 and an "ENTER" switch 41 so that the computer 40 receives an indication of the volume of the liquid pumped into the calibrated chamber wall 29 by operation of the pumping means 18 for the predetermined number of part revolutions and will determine the volume of the liquid pumped by each part revolution of the pumping means 18; operating the pump 12 by manual manipulation of the "PURGE FWD" switch 36 until the pump 12 moves the liquid into the tube 35 and to it point of connection to the pipe 34, which location of the liquid can be seen through the translucent tube 35; and entering into the computer 40 the number of ounces of the liquid desired in the container 11 to thereby cause the computer 40 to operate the motor 20 and rotate the pumping means 18 a number of part revolutions determined by the computer 40 to deliver the desired volume of liquid to the container 11, which entering can be done either (1) directly by use of the numeric key pad 42, a "TOTAL OZ" switch 44, and the "ENTER" switch 41, or (2) by providing two separate inputs to the computer 40, one representing the number of acres to which the liquid is to be applied entered through the use of the numeric key pad 42, an "ACRES" switch 45, and the "ENTER" switch 41, and the other representing the number of ounces of the liquid required per acre entered through the use of the numeric key pad 42, the "OZ/ACRE" switch 46, and the "ENTER" switch 41.

The System 10 as illustrated also includes a transfer tube assembly 55 (FIGS. 1 and 2) including the flange 56 and pipe 34 at a first end, a pipe tee 57 at an opposite second end to which tee 57 two quick connect couplings 58 are attached to provide means adapted for being coupled into a fluid transfer line (not shown), and a ball valve 60 between the first and second ends having a portion movable by manual actuation of a lever 62 between a closed position restricting the flow of liquid from the first to the second end of the tube assembly 55 to thereby retain liquid in the container 11, and an open position affording the flow of liquid through the tube assembly 55 from the container 11 so that liquid (e.g. a herbicide) in the container 11 will flow into and mix with liquid (e.g., water) flowing through transfer lines connected to the couplings 58 to equipment for applying mixture.

Instead of using the container 11 and transfer tube assembly 55, it is also possible to disconnect the tube 35 from the outlet opening of the chamber 29, and connect a different tube or hose at that outlet opening through which the liquid may be delivered directly to a container on equipment for applying the liquid.

As is best seen in FIGS. 4 and 5, the pump 20 used in the system 10 according to the present invention is a structure of the type commonly used in a hydraulic system as a hydraulic motor driven by hydraulic fluid pumped through the motor by a hydraulic fluid pump in that hydraulic system (e.g., a "Gerotor" hydraulic motor commercially available from Nichols, Portland, Me.). The housing 14 of the pump 12 comprises three parts 70, 71 and 73 held together by bolts 74, aligned by pins 75 and having adjacent surfaces sealed by O rings 76. The parts 70 and 73 define flat circular end surfaces for the cavity 13 with the part 73 having the inlet and outlet passageways 16 and 17 and supporting hose barbs for attaching the inlet and outlet hoses 24 and 25 to those passageways 16 and 17 respectively; whereas the part 71 defines a cylindrical inner surface for the cavity (e.g., 1.281 inch diameter and 0.303 long). The pumping means 18 includes a spur gear like portion 78 having an odd number or five radially outwardly projecting tooth like parts 79 coaxially attached on a drive shaft 80 for the pump 12, which drive shaft 80 is fixed to the rotor portion 19 of the motor 20. The drive shaft 80 extends into the cavity 13 through a cylindrically opening in the housing part 70 that contains two spaced bearings 84 rotatably supporting the shaft 80 and a seal (not shown) adjacent the cavity 13. The pumping means 18 also includes an internal gear like portion 82 rotatably mounted in the cavity 13 for rotation about an axis parallel to and spaced from (e.g., by 0.052 inch) the axis of the spur gear like portion 78 and having an even number or six radially inwardly projecting tooth like parts 83. The tooth like parts 79 and 83 are sized and shaped so that the one of the tooth like parts 79 on the spur gear like portion 78 reaches into the spaces between two adjacent tooth like parts 83 on the internal gear like portion 82 on a first side of the cavity 13, whereas the distal end of the tooth like part 79 on the spur gear portion 78 on the opposite second side of the cavity 13 moves in close spaced relationship along the peripheral surface of the adjacent inwardly projecting tooth like part 83 on the internal gear like portion 82. The inlet and outlet passageways 16 and 17 are crescent shaped, are positioned along opposite halves of the cavity 13, and extend generally between the first and second sides of the cavity 13. Rotation of the spur gear like portion 78 by the rotor portion 19 of the motor 20 in either direction will pull liquid from the inlet or outlet passageway 16 or 17 into the spaces between the tooth like parts 79 and 83 moving from the the first toward the second side of the cavity 13 and will expel the liquid through the inlet or outlet passageway 16 or 17 from the spaces between the gear like parts 79 and 83 moving from the second toward the second side of the cavity 13. It has been found that when the side tolerances between the parallel flat sided external and internal gear like portions 78 and 82 arts and the pump housing parts 71 and 73 are are adjusted to about 0.0025 centimeter (0.001 inch), rotation of the pumping means 18 in either direction will produce a uniform pumping action of liquid through the cavity 13 between the inlet and outlet passageways 16 and 17 by engagement and disengagement of the tooth like parts 79 and 83.

The motor 20 can be a 12 volt direct current permanent magnet motor (e.g., motor model No. 3B-1212182A sold by Minnesota Electric Technology, Winebago, Minn. 56098) and has a flatted output shaft on its rotor 19 fixed in a cylindrical socket in the end of the shaft 80 of the pump 12 by spaced set screws (not shown). The housing 21 of the motor 20 is attached to the floor of a metal housing 85 of the portable electronic/pumping assembly 9; whereas to restrict deleterious effects of axial misalignment between the rotor 19 and pump shaft 12, the pump housing 14 is not attached to the housing 85, but is prevented from rotating relative to the housing 85 by a support foot 86 fixed to the pump housing 14 transverse to its axis and spaced rubber pads 87 between the support foot 86 and the floor of the metal housing 85.

The counting means 23 comprises a plurality of equally spaced radially projecting blades 88 (e.g., six blades 88) fixed coaxially on a cylindrical collar around the joined shafts of the rotor 19 and the pump 12; a ultra violet light source 89, and a light sensor assembly 90 mounted so that as the blades 88 rotate they move sequentially between the light source 89 and the light sensor 90 which is connected to the computer 40, providing six signals to the computer 40 or control system for each part revolution of the pump shaft 80.

The electrical solenoid operated normally off valve assembly 26 includes a vertically reciprocal valve member (not shown) which, when the solenoid on the top end of the valve assembly 26 is deactivated, is positioned to block the flow of liquid between the hoses 25 and 27; and, when the solenoid on the valve assembly 26 is activated, allows flow of liquid through the valve assembly 26 between the hoses 25 and 27. The solenoid is electrically connected to be operated when the motor is actuated in either direction, and to be deactivated when the motor is not actuated to prevent liquid from flowing in either direction through the pump 12 or other portions of the system.

The tubular wall 29 is mounted on the frame 15 by a pair of spaced blocks 92 having opposing bores in which opposite ends of the tubular wall 29 are received and sealed by O-rings around the ends of the tube that are in sealing engagement with the walls of the blocks defining the bores. Hose barbs to which the hose 27 or the tube 25 are attached are engaged with the sides of the blocks opposite the tubular wall 29 with bores in the hose bibs in communication with the bores in which the ends of the tube 25 are received. Four spaced bolts 93 extend between the blocks 92 and maintain them in engagement with the ends of the tubular wall 29.

The tube 25 is coupled to the pipe 34 close to the top of the ball valve 60 so that the tank 11 can be almost completely emptied of liquid by reverse operation of the pump 12. The tank 11 is translucent and has calibrated markings 94 along one edge that allow an operator to estimate the volume of liquid in the tank 11 at any one time.

The control panel 37 has digital read-outs 95 that provide the operator information concerning numbers being entered into or determined by the computer 40. Values entered into the computer such as "Acres" by the switch 45 or "OZ/ACRE" by the switch 46, or "TOTAL OZ" by the switch 44 can be read on the read-outs 95 by depressing those switches. In addition to the switches previously described, there is a main on-off switch 96 for the electronics on the front panel of the frame 85 for the electronic/pumping assembly 9 which controls electrical power coupled to the electronic/pumping assembly 9 by a cord (not shown) from a conventional external power source. Also, the control panel 37 for the computer 40 includes a "START" switch 97 used to start transfer of liquid to the tank 11, such transfer being interrupted until the "START" switch 97 is again pressed if any switch on the control panel 37 is pressed during transfer; a "STOP" switch 98 which, when pressed twice after transfer of liquid to the tank 11 has been started, will permanently stop that transfer; an "ACC OZ" switch 99 which can be activated to show on the read-outs 95 the total amount of ounces that have been transferred since the system was calibrated which can be set to zero by pressing the "ACC OZ" switch 101 followed by a "CE" (clear entry) switch 105; a "XFER'D" switch 101 which can be pressed to show in the read-outs 95 the total of liquid transferred in the last transfer, this value is automatically reset by completion of each new transfer and can be set to zero by pressing the "XFER'D" switch 101 followed by the "CE" switch 105; and a "LOCK" switch 100 which, when pressed, will prevent inadvertent changes in values entered into the system 10, and after being activated must be pressed followed by the "CE" switch 105 to allow the operator to change various values entered into the system 10, including the calibration value, and values for acres, ounces per acre, total ounces and accumulated total ounces.

The electronic/pumping assembly 9 can be removed from the frame 15 by disconnecting the hose 27 from the hose bib at the lower block 92, which may be convenient to store the electronic/pumping assembly 9 in a more secure or in an environmentally protected area (e.g., out of the rain) without the need to move the portions of the system 10 fixed on the frame 15.

The present invention has now been described with reference to one embodiment thereof. It will be apparent to those skilled in the art that many changes can be made in the embodiment described (some of which changes are described in the introduction to the specification) without departing from the scope of the present invention. Thus the scope of the present invention should not be limited to the structure and method described in the this application, but only by structures and methods described by the language of the claims and the equivalents of those structures and methods.

We claim:

1. A system adapted for use to transfer a desired volume of liquid chemical from a supply of the liquid chemical to a container, said system comprising:

a frame;

a pump comprising a pump housing mounted on said frame, said pump housing having a cavity and having inlet and outlet passageways communicating with said cavity, and pumping means mounted for rotation in either direction relative to said housing, and adapted for correspondingly moving liquid through said cavity in either direction between said inlet and outlet passageways;

a motor having a fixed portion mounted on said frame, and a rotor rotatably mounted on said fixed portion and coupled to said pumping means, the motor being adapted to rotate the rotor portion and the pumping means in either direction;

counting means for counting part revolutions of said pumping means;

means adapted for connecting the supply of the liquid to the inlet passageway of the pump housing;

a wall defining a chamber having inlet and outlet openings;

liquid level indicating means for providing an indication of different volumes of liquid in the chamber including initial level indicating means indicating a predetermined small volume of liquid in the chamber compared to the total volume of the chamber and upper level indication means indicating a larger volume of liquid in the chamber than said initial level indicating means;

means for conveying liquid expelled from the outlet opening of said pump housing to the inlet opening of said chamber;

means adapted for conveying liquid expelled from the outlet opening of said chamber to the container;

pump calibrating means including control means for operating said motor and thereby said pumping means to pump liquid into the chamber until the upper surface of the liquid within the chamber is aligned with the initial level indicating means;

operating means for operating said pumping means for a predetermined or determinable number of part revolutions with the upper surface of the liquid within the chamber initially aligned with said initial level indicting means to correspondingly pump a determinable or predetermined volume of the liquid into the chamber; and means including a programmed computer for receiving an indication of the determinable number of part revolutions from said counting means or of the determinable volume from said level indicating means and for dividing the volume of the liquid pumped into the chamber by operation of said pumping means for said number of part revolutions by the number of part revolutions to thereby determine the volume of the liquid pumped by each part revolution of the pumping means; and means for receiving an indication of the desired volume of the liquid and for operating said motor only for a determined number of part revolutions to deliver the desired volume of liquid to the container.

2. A system according to claim 1 wherein said liquid level indicating means for providing an indication of different volumes of liquid in the chamber comprises said wall having a plurality of calibration marks with individual identifying indicia each indicating a different volume of liquid within the chamber when the upper surface of the liquid within the chamber is aligned with the mark, the calibration marks including a base mark providing the initial level indicating means; said control means is manually actuatable to operate said motor and thereby said pumping means in either direction to pump liquid into the chamber and to align the upper level of the liquid in the chamber with said base mark; said operating means operates said pumping means for a predetermined number of part revolutions to pump a determinable volume of liquid into the chamber; the indication of the determinable volume of liquid pumped into the chamber is determined by visually aligning the upper surface of the liquid in said chamber with one of said calibration marks and reading the identifying indicia adjacent that calibration mark; and said programmed computer has an input for receiving a manually generated input representing that identifying indicia representing the determinable volume of the liquid in the chamber.

3. A system according to claim 1 wherein said liquid level indicating means for providing an indication of different volumes of liquid in the chamber comprises said wall having two calibration marks each indicating a different volume of liquid within the chamber when the upper surface of the liquid within the chamber is aligned with the mark, the calibration marks including a base mark providing the initial level indicating means and an upper mark providing the upper level indication means with the chamber being adapted to contain a predetermined volume of liquid between said base and upper marks; said control means comprises manually actuatable means for operating said motor and thereby said pumping means in either direction to pump liquid into the chamber and to align the upper level of the liquid in the chamber with said base mark; said operating means includes manually actuatable means for operating the pumping means for any determinable number of part revolutions needed to pump the predetermined volume of liquid into the chamber indicated by visual alignment of the upper level of the liquid in the chamber with said upper mark; said determinable number of part revolutions of said pumping means to pump said predetermined volume of liquid into the calibrated chamber is determined by said counting means, and means for providing said programmed computer with an input from said counting means indicating said determined number of part revolutions.

4. A system according to claim 1 wherein the container is included in said system and is mounted on said frame, and said system further comprises a transfer tube assembly including a first end coupled to said container, a second opposite end including means adapted for being coupled into a fluid transfer line, and a valve between said first and second ends having a portion movable between a closed position restricting the flow of liquid from the first to the second end of the tube assembly, and an open position affording the flow of liquid through the tube assembly from the first to the second end of the transfer tube assembly.

5. A system according to claim 1 wherein said means for receiving an indication of the desired volume of the liquid and for operating said motor for a determined number of part revolutions to deliver the desired volume of liquid to the container comprises the programmed computer being adapted to receive an input representing an amount of volume for a designated area, and a separate input representing a number of said designated areas.

6. A system according to claim 1 wherein said means for receiving an indication of the desired volume of the liquid and for operating said motor for a determined number of part revolutions to deliver the desired volume of liquid to the container comprises the programmed computer being adapted to receive an input representing an amount of volume per acre, and a separate input representing a number of acres.

7. A method for transferring a desired volume of a liquid chemical from a supply of the liquid chemical to a container, said method comprising the steps of:

providing a pump comprising a pump housing having a cavity and having inlet and outlet passageways communicating with said cavity, and pumping means mounted for rotation in either direction relative to said housing and adapted for correspondingly moving liquid through said cavity in either direction between said inlet and outlet passageways; a motor having a rotor rotatably mounted on a fixed portion and coupled to said pumping means, the motor being adapted to rotate the rotor portion and the pumping means in either direction; a wall defining a chamber having inlet and outlet openings; liquid level indicating means for providing an indication of different volumes of liquid in the chamber including initial level indicating means indicating a predetermined small volume of liquid in the chamber compared to the total volume of the chamber and upper level indicating means above the initial level indicating means indicating a larger volume of liquid in the chamber than said initial level indicating means; means for conveying liquid expelled from the outlet opening of the pump housing to the inlet opening of the chamber; and means for conveying liquid expelled from the outlet opening of the chamber to the container;

providing a supply of the liquid at the inlet opening of the pump housing;

operating the motor and thereby the pumping means to provide a liquid level in the chamber at the initial level indicating means;

operating the motor and thereby the pumping means for a predetermined number of part revolutions with said liquid level in said chamber initially positioned at the initial level indicating means to pump an unknown volume of liquid into the chamber;

using the level indicating means to provide an indication of the volume of liquid pumped into the chamber;

entering said indication into a computer programmed to divide the volume of the liquid pumped into the chamber by operation of said pumping means for said predetermined number of part revolutions by the predetermined number of part revolutions to thereby determine the volume of the liquid pumped by each part revolution of the pumping means; and operating said motor to rotate the pumping means only for a number of part revolutions determined to deliver the desired volume of liquid to the container.

8. A method according to claim 7 wherein the liquid level indicating means for providing an indication of different volumes of liquid in the chamber comprises the wall having a plurality of calibration marks each indicating a different volume of liquid within the chamber when the upper surface of the liquid within the chamber is aligned with the mark, and an individual identifying indicia adjacent each mark, the calibration marks including a base mark providing the initial level indicating means; said first operating step includes the step of manually actuating the motor and thereby the pumping means in either direction to pump liquid into the chamber and visually aligning the upper level of the liquid in the chamber with the base mark; said step of using the level indicating means to provide an indication of the volume of liquid pumped into the chamber comprises the steps of visually aligning the upper surface of the liquid in said chamber with one of said calibration marks and reading the identifying indicia adjacent that calibration mark; and said step of entering said indication into a computer comprises the step of entering into the computer a manually generated input representing the identifying indicia representing the volume of the liquid in the chamber.

9. A method according to claim 7 further including the steps of
providing a transfer tube assembly including a first end coupled to the container, a second opposite end including means adapted for being coupled into a fluid transfer line, and a valve between the first and second ends having a portion movable between a closed position restricting the flow of liquid from the first to the second end of the tube assembly, and an open position affording the flow of liquid through the tube assembly from the first to the second end of the transfer tube assembly;
coupling the second end to a fluid transfer line;
positioning the valve in the closed position from said providing through said operating step; and
positioning the valve in the open position after said operating step to transfer the desired volume of liquid from the container to the transfer line.

10. A method according to claim 7 wherein the programmed computer is adapted for operating the motor for the determined number of part revolutions to deliver the desired volume of liquid to the container and is adapted to determine the number of part revolutions and operate the motor after receiving separate inputs representing a volume of liquid for a designated area, and a number of the designated areas; and
said operating step includes the steps of providing separate inputs to the computer representing a volume of liquid for a designated area, and a number of the designated areas.

11. A method for transferring a desired volume of a liquid chemical from a supply of the liquid chemical to a container, said method comprising the steps of:
providing a pump comprising a pump housing having a cavity and having inlet and outlet passageways communicating with said cavity, and pumping means mounted for rotation in either direction relative to said housing, and adapted for correspondingly moving liquid through said cavity in either of two opposite directions between said inlet and outlet passageways; a motor having a rotor rotatably mounted on a fixed portion and coupled to said pumping means, the motor being adapted to rotate the rotor portion and the pumping means in either direction; a wall defining a chamber having inlet and outlet openings; liquid level indicating means for providing an indication of different volumes of liquid in the chamber including initial level indicating means indicating a predetermined small volume of liquid in the chamber compared to the total volume of the chamber and an upper level indicating means above the initial level indicating means; means for conveying liquid expelled from the outlet opening of the pump housing to the inlet opening of the chamber; and means for conveying liquid expelled from the outlet opening of the chamber to the container;
providing a supply of the liquid at the inlet opening of the pump housing;
operating the motor and thereby the pumping means to provide a liquid level in the chamber at the initial level indicating means;
operating the motor and thereby the pumping means with said liquid level in the chamber initially positioned at said initial level indicating means for a number of part revolutions necessary to pump a predetermined volume of liquid into the chamber, which predetermined volume is determined by aligning the upper surface of the liquid pumped into the chamber with the upper level indicating means;

entering the number of part revolutions of the pumping means necessary to pump the predetermined volume of liquid into the chamber into a computer programmed to divide the predetermined volume of the liquid pumped into the chamber by operation of said pumping means by the number of part revolutions necessary to pump the predetermined volume to thereby determine the volume of the liquid pumped by each part revolution of the pumping means; and operating said motor to rotate the pumping means only for a number of part revolutions determined to deliver the desired volume of the liquid to the container.

12. A method according to claim 11 wherein the liquid level indicating means for providing an indication of different volumes of liquid in the chamber comprises the wall having two calibration marks each indicating a different volume of liquid within the chamber when the upper surface of the liquid within the chamber is aligned with the mark, the calibration marks including a base mark providing the initial level indicating means and an upper mark providing the upper level indicating means, with the chamber being adapted to contain a predetermined volume of liquid between said base and upper marks; said operating steps include the steps of manually actuating the motor and thereby the pumping means in either direction to pump liquid into or out of the chamber and visually aligning the upper level of the liquid in the chamber with the marks; said determinable number of part revolutions of said pumping means to pump said predetermined volume of liquid into the calibrated chamber is determined by counting means for counting the number of part revolutions of said pumping means, and said programmed computer has an input receiving an indication of said determined number of part revolutions from said counting means.

13. A method according to claim 11 further including the steps of providing a transfer tube assembly including a first end coupled to the container, a second opposite end including means adapted for being coupled into a fluid transfer line, and a valve between the first and second ends having a portion movable between a closed position restricting the flow of liquid from the first to the second end of the tube assembly, and an open position affording the flow of liquid through the tube assembly from the first to the second end of the transfer tube assembly;

coupling the second end to a fluid transfer line;

positioning the valve in the closed position prior to said operating step; and positioning the valve in the open position after said operating step to transfer the desired volume of liquid from the container to the transfer line.

14. A method according to claim 11 wherein the programmed computer is adapted for operating the motor for the determined number of part revolutions of the pumping means needed to deliver the desired volume of liquid to the container and is adapted to determine the number of part revolutions and operate the motor after receiving separate inputs representing a volume of liquid for a designated area, and a number of the designated areas; and said operating step includes the steps of providing separate inputs to the computer representing a volume of liquid for a designated area, and a number of the designated areas.

* * * * *